United States Patent
Fryda et al.

(10) Patent No.: US 12,116,323 B2
(45) Date of Patent: Oct. 15, 2024

(54) METHOD FOR MANUFACTURING A HYDRAULIC BINDER

(71) Applicant: IMERTECH, Paris (FR)

(72) Inventors: Hervé Fryda, Meyrie (FR); Ratana Soth, Lyons (FR); Rose-Marie Mineau, Valencin (FR); Eric Larnaudie, Bourgoin-Jallieu (FR)

(73) Assignee: IMERTECH, Paris (FR)

( * ) Notice: Subject to any disclaimer, the term of this patent is extended or adjusted under 35 U.S.C. 154(b) by 636 days.

(21) Appl. No.: 17/290,215

(22) PCT Filed: Oct. 30, 2019

(86) PCT No.: PCT/FR2019/052582
§ 371 (c)(1),
(2) Date: Apr. 29, 2021

(87) PCT Pub. No.: WO2020/089564
PCT Pub. Date: May 7, 2020

(65) Prior Publication Data
US 2022/0017414 A1   Jan. 20, 2022

(30) Foreign Application Priority Data

Oct. 31, 2018   (FR) ...................................... 1860094

(51) Int. Cl.
| | | |
|---|---|---|
| C04B 7/32 | (2006.01) | |
| B01J 23/02 | (2006.01) | |
| C01F 7/164 | (2022.01) | |
| C04B 7/44 | (2006.01) | |
| C04B 28/06 | (2006.01) | |
| C04B 111/00 | (2006.01) | |

(52) U.S. Cl.
CPC ................. *C04B 7/32* (2013.01); *B01J 23/02* (2013.01); *C01F 7/164* (2013.01); *C04B 7/44* (2013.01); *C04B 28/06* (2013.01); *C04B 2111/0081* (2013.01); *C04B 2111/0087* (2013.01)

(58) Field of Classification Search
CPC .......... B01J 23/04; B01J 23/005; C04B 7/32; C04B 7/44; C04B 28/06; C04B 2111/0081; C04B 2111/0087; C01F 7/164; C01F 7/44
USPC ................... 502/341, 524; 106/692; 423/600
See application file for complete search history.

(56) References Cited

U.S. PATENT DOCUMENTS

| | | |
|---|---|---|
| 3,156,751 A | 11/1964 | Valdes et al. |
| 3,226,240 A | 12/1965 | Crowley |
| 4,353,751 A * | 10/1982 | Baudouin .............. D21H 21/52 106/464 |
| 4,410,455 A * | 10/1983 | Lambert ................... C07C 5/02 585/260 |
| 4,710,225 A | 12/1987 | Rucker |
| 7,235,225 B2 * | 6/2007 | Hosono .................... B01J 23/02 424/688 |
| 2006/0118006 A1 | 6/2006 | Amathieu et al. |
| 2014/0338569 A1 * | 11/2014 | Ostrander ............... C04B 28/06 106/692 |

FOREIGN PATENT DOCUMENTS

| | | | |
|---|---|---|---|
| CN | 1405092 A | 3/2003 | |
| CN | 103880053 A | 6/2014 | |
| FR | 2 839 066 B1 | 2/2005 | |
| JP | 51111828 A * | 10/1976 | ............. C04B 28/06 |
| JP | S52101700 A | 8/1977 | |
| JP | S62128919 A | 6/1987 | |
| JP | S63-95114 | 4/1988 | |
| JP | H0297443 A | 4/1990 | |
| JP | H08119630 A | 5/1996 | |
| JP | H10287420 A | 10/1998 | |
| JP | 2005523864 A | 8/2005 | |
| JP | 2018002546 A | 1/2018 | |
| WO | WO-9508516 A1 * | 3/1995 | ............. C04B 35/44 |

OTHER PUBLICATIONS

International Search Report for PCT/FR2019/052582 dated Mar. 11, 2020, 5 pages.
Written Opinion of the ISA for PCT/FR2019/052582 dated Mar. 11, 2020, 6 pages.
French Search Report and Written Opinion for FR 1860094 dated Aug. 6, 2019, 13 pages.

* cited by examiner

*Primary Examiner* — Patricia L. Hailey
(74) *Attorney, Agent, or Firm* — NIXON & VANDERHYE

(57) ABSTRACT

Disclosed is a method for manufacturing a hydraulic binder including a calcium aluminate, which involves: a) providing a composition including a lime C source compound and an alumina source compound, the composition including at most 95% lime C and alumina, and at least 23% alumina, by weight relative to the total weight of dry matter of the composition; b) placing the composition provided in step a) in a moisture-saturated environment, at a hydration temperature of between 40° C. and 150° C., so as to precipitate hydrated phases containing at least one aluminium oxide combined with a calcium oxide and with water; and c) subjecting the precipitates obtained in step b) to a baking temperature of between 200° C. and 1300° C., for at least 15 minutes.

19 Claims, No Drawings

METHOD FOR MANUFACTURING A HYDRAULIC BINDER

CROSS-REFERENCE TO RELATED APPLICATIONS

This application is the U.S. national phase of International Application No. PCT/FR2019/052582 filed Oct. 30, 2019 which designated the U.S. and claims priority to FR 1860094 filed Oct. 31, 2018, the entire contents of each of which are hereby incorporated by reference.

BACKGROUND OF THE INVENTION

Field of the Invention

The present invention generally relates to the field of manufacturing methods for manufacturing hydraulic binders.

More particularly it relates to a hydraulic binder manufacturing method for manufacturing a hydraulic binder comprising a calcium aluminate.

The invention also relates to a calcium aluminate compound and a use for this calcium aluminate compound.

Description of the Related Art

Manufacturing methods for manufacturing hydraulic binders that comprise a calcium aluminate are already known, in particular methods by total fusion, that are implemented in electric furnaces or reverberatory furnaces, and the sintering or frittage methods that are implemented in rotary furnaces. These known methods include a step of high temperature firing, that is to say, at a temperature above 1300° C., thereby enabling the raw materials to react with each other. However, this high temperature firing step leads to high energy consumption.

The aforementioned manufacturing methods also include a final grinding step consisting of the product, known as clinker, which is obtained at the conclusion of the high temperature firing step, being reduced to a fine powder. This grinding step also makes it possible to add other compounds to the cement in order to functionalise it, in particular so as to control the reactivity or delay the aging thereof. However, the energy efficiency of grinding by means of a conventional ball mill is only around 5%, with the vast majority of the energy used in this step being dissipated in the form of heat.

Thus, the steps of firing and grinding in the aforementioned manufacturing methods are both highly energy-intensive, and the methods for manufacturing known hydraulic binders are therefore costly in terms of energy comsumption.

SUMMARY OF THE INVENTION

In order to remedy the aforementioned drawbacks with respect to the state of the art, the present invention provides a manufacturing method for manufacturing calcium aluminate that is more energy-efficient.

More particularly, a hydraulic binder manufacturing method is provided in accordance with the invention, for manufacturing a hydraulic binder, comprising a calcium aluminate, the method including the following steps:

a) providing a composition comprising a lime source compound and an alumina source compound, the said composition comprising a maximum of 95% lime and alumina, and a minimum of 23% alumina, by mass relative to the total mass of dry matter of the composition;

b) placing the composition provided in step a) in a moisture-saturated environment (medium), at a hydration temperature comprised between 40° C. and 150° C., so as to precipitate the hydrated phases comprising at least one aluminium oxide combined with a calcium oxide and with water;

c) subjecting the precipitates obtained in step b) to a firing temperature comprised between 200° C. and 1300° C., keeping them thereat for at least 15 minutes.

Thus, the method according to the invention is based on a reaction in two steps, a first step of hydration and a second step of firing at a lower temperature.

This method generates a reasonable level of energy consumption, with the compounds of the composition reacting, in step b), at a low temperature comprised between 40° C. and 150° C. only, and the precipitates thus obtained thereafter being dehydrated at a temperature comprised between 200° C. and 1300° C.

Furthermore, the material obtained at the end of step c) is very friable, such that it can be easily reduced into powder. Thus, only fairly low energy is necessary for the grinding of this material.

On the other hand, in step a), the composition includes a maximum of 95% of lime C and alumina such that it comprises compounds that are naturally available and therefore less expensive than pure synthetic compounds.

The object of the invention also relates to producing hydraulic binders wherein the phases are rich in alumina. A composition comprising less than 23% of alumina tends to generate a significant amount of uncombined residual lime at the end of step c).

Other non-limiting and advantageous characteristic features of the method according to the invention, taken into consideration individually or in accordance with any technically possible combination, are as follows:

in step a), the composition has a molar ratio of lime to alumina C/A of between 0.5 and 3;

in step a), the composition has a molar ratio of lime to alumina tri-hydrate $C/AH_3$ of between 0.5 and 3;

in step a), the composition is in the form of a set of particles whereof the particle size distribution is defined by a reference diameter d80 that is less than or equal to 100 micrometres;

in step a), the composition comprises at least 5% of compounds selected from the following list: alumina mono-hydrate AH such as boehmite, iron oxides, silica $SiO_2$, calcite $CaCO_3$, titanium oxide $TiO_2$; hydrated or non-hydrated salts that combine, as anion: sulfates, silicates, carbonates, nitrates, phosphates; and as cation: calcium, magnesium, iron, in particular hydrated or non-hydrated calcium salts such as calcium sulfates and calcium carbonate; hydrated or non-hydrated aluminum salts such as aluminum silicates and in particular kaolin; aluminum sulfates; chlorine salts or chlorinated residues; magnesium salts, or indeed even sodium salts such as sodium chloride available in particular in sea water, in step a), the composition does not comprise more than 20% of silica;

in step a), the composition does not comprise more than 15% of silica;

in step a), the composition does not comprise more than 10% of silica;

in step a), the composition does not comprise more than 8% of silica;

in step a), the composition does not comprise more than 6% of silica;

in step b), the composition is placed in excess liquid water or in an atmosphere of saturated vapour;

in step b), the composition is placed in the moisture-saturated environment (medium) for a period of between 15 minutes and 48 hours;

in step c), the precipitates are subjected to the firing temperature, being kept thereat for less than 240 minutes;

in step c), the firing temperature is comprised between 400° C. and 1200° C., preferably between 900° C. and 1000° C., indeed more preferentially between 930° C. and 970° C.;

in step c), the firing temperature is comprised between 300° C. and 750° C., preferably between 350° C. and 700° C.;

in step b), the hydration temperature is less than 100° C.;

the alumina source compound of step a) is in dry form, preferably in crystallised form, that is to say it is not in gel form.

the alumina source compound of step a) is selected from the following list: bauxite such as bauxite trihydrate (bauxite comprising mainly alumina in the form of $AH_3$), white bauxite trihydrate, red bauxite trihydrate, hydroxides, by-products of the aluminum industry, and products not complying with manufacturing standards and having high alumina content or a mixture thereof, iron-rich bauxite trihydrate, iron-poor bauxite trihydrate, hydrated aluminosilicates such as kaolin, or synthetic alumina tri-hydrate $AH_3$;

the composition of step a) is formed by the admixture of at least two compounds selected from the following list: bauxite trihydrate (bauxite comprising mainly alumina in the form of $AH_3$) that is iron rich, iron poor bauxite trihydrate, quicklime or hydrated lime, calcium sulfate, calcium carbonate, hydrated aluminosilicates such as kaolin, synthetic alumina tri-hydrate $AH_3$, chlorinated salts or residues such as sodium chloride NaCl or sea water, or even nitrated salts or residues such as calcium nitrate $CaNO_3$ or pig manure slurry;

the composition of step a) comprises a maximum of 0.4% by weight of fluorinated compounds selected from a $CaF_2$ source and/or cryolite $Na_3AlF_6$, relative to the weight of the dry composition of step a); alternatively the composition of step a) comprises a maximum of 0.3% by weight, for example a maximum of 0.2% by weight of fluorinated compounds selected from a $CaF_2$ source and/or cryolite $Na_3AlF_6$, relative to the weight of the dry composition of step a); for example, the composition of step a) does not comprise fluorinated compounds selected from a $CaF_2$ source and/or cryolite $Na_3AlF_6$;

the method according to the invention does not include the addition of fluorinated compounds selected from a $CaF_2$ source and/or cryolite $Na_3AlF_6$.

The invention also provides a calcium aluminate compound obtained according to the method of the invention.

The invention also provides a use for this calcium aluminate compound as a hydraulic binder, either alone or combined with calcium sulfate and possibly portland cement, for example in the following applications:

in building chemistry, for the production of mortars such as repair mortars, tiling adhesives and grouts or joints, smoothing or finishing screeds and coatings, or even decorative plasters or coatings;

as a binder for refractory concrete;

as a binder for civil engineering concrete;

as a binder for any prefabrication type method;

as binders for cementing of boreholes;

as a binder for dry or wet sprayed concrete (shotcrete);

as a binder for inertisation of solid wastes or liquid effluents;

as a binder for the production of mineral/inorganic foams;

as a reagent for entrapment of anions and/or cations.

The invention finally provides a use for this calcium aluminate compound, either alone or combined with calcium sulfate and possibly portland cement, for example in the following applications:

as a metallurgical flux;

as a mineral filler;

as a catalyst or catalyst support;

as a pigment;

as an abrasive.

DESCRIPTION OF THE PREFERRED EMBODIMENTS

The description and the examples of embodiment presented here below without limitation, will serve to provide a better understanding of the invention in terms of what consists of and how it may be implemented.

By convention, in the remainder of the description and unless otherwise specified, the indication of a range of values "from X to Y" or "between X and Y" is understood to include the values X and Y. On the contrary, a range of values which extends "strictly from X to Y" or "strictly between X and Y" is understood to exclude the values X and Y.

In the remainder of the description, the term "hydraulic binder" is used to refer to a material which hardens when mixed with water, without the addition of another reactive body, and both in air as well as in water. The phenomenon of "setting" or "hydraulic setting" refers to the hydraulic binder which is in the process of hardening after being brought into contact and mixed with water.

By convention, in the remainder of the description, the term "calcium aluminate" is understood to refer to both an undoped calcium aluminate as well as a calcium aluminate doped with one or more compounds selected from: alumina mono-hydrate AH such as boehmite, iron oxides, silica $SiO_2$, calcite $CaCO_3$, titanium oxide $TiO_2$; hydrated or non-hydrated salts that combine, as anion: sulfates, silicates, carbonates, nitrates, phosphates; and as cation: calcium, magnesium, iron, in particular hydrated or non-hydrated calcium salts such as calcium sulfates and calcium carbonate; hydrated or non-hydrated aluminum salts such as aluminum silicates and in particular kaolin; aluminum sulfates; chlorine salts or chlorinated residues; magnesium salts, or indeed even sodium salts such as sodium chloride available in particular in sea water. For example, a calcium silicoaluminate is a particular example of calcium aluminate doped with silica. Thus, a calcium aluminate cement refers to a powder that essentially comprises one or more calcium aluminates, and forms a particular type of hydraulic binder.

By convention also, in the following sections, the term "alumina tri-hydrate $AH_3$" will be used to refer to the compound comprising one molecule of alumina $Al_2O_3$ for three molecules of water $H_2O$, and "alumina mono-hydrate AH" will be used to refer to the compound comprising one molecule of alumina $Al_2O_3$ for one molecule of water $H_2O$.

Finally, as is common in cement chemistry, the following abbreviations will be used: A for alumina $Al_2O_3$, C for lime CaO, S for silica $SiO_2$, H for water $H_2O$, $ for sulfur oxide $SO_3$, and F for iron oxide $Fe_2O_3$.

The method according to the invention consists in manufacturing a hydraulic binder that comprises a calcium aluminate, first by combining the compounds by means of a hydration reaction leading to the formation of the hydrated phases in the form of precipitates, then followed by calcining the hydrated phases obtained.

The method according to the invention more precisely includes the following steps:
a) providing a composition comprising a lime source compound C and an alumina source compound, the said composition comprising a maximum of 95% lime C and alumina, and a minimum of 23% alumina, by mass relative to the total mass of dry matter of the composition;
b) placing the composition provided in step a) in a moisture-saturated environment (medium), at a hydration temperature comprised between 40° C. and 150° C., so as to precipitate the hydrated phases comprising at least one aluminium oxide combined with a calcium oxide and with water;
c) subjecting the precipitates obtained in step b) to a firing temperature comprised between 200° C. and 1300° C., keeping them thereat for at least 15 minutes.

The general principle underlying the method according to the invention is as follows. In step b), the composition is placed in the moisture-saturated environment (medium), in a manner such that the compounds of this composition release ions (that is to say, they dissolve). These ions recombine with each other in the form of hydrated phases comprising at least one aluminum oxide combined with a calcium oxide and with water. Upon saturation, the hydrated phases precipitate (that is to say, they crystallise). The precipitation of the hydrated phases induces a drop in ionic concentrations in the moisture-saturated medium, which again causes the release of ions from the compounds in the composition. The dissolution/precipitation reactions continue until the compounds in the composition are entirely depleted. This is what is referred to as the "hydration reaction" in step b).

These dissolution/precipitation reactions make it possible to combine (in the form of oxides) the calcium Ca and aluminum Al elements with a very low energy input, and at a low temperature.

In the step c) of firing, one objective is to break the atomic bonds between the calcium and aluminum ions and the water molecules of the hydrated crystallised phases formed in step b). These breaks in bonds of the water molecule lead to the formation of amorphous and/or crystalline calcium aluminates. Another objective may be to recombine in a controlled manner, the dehydrated species.

The steps a), b) and c) are explained in greater detail below.

Step a)

In order for the hydration reaction to be able to take place in step b) and lead to the formation, in step c), of the hydraulic binder comprising at least one calcium aluminate, it is necessary for the compounds of step a) to be capable of releasing at least ions that comprise calcium and ions that comprise aluminum.

The compound that releases, in water, at least one ion comprising calcium is in this instance the lime source compound, while the compound that releases, in water, at least one ion comprising aluminum is the alumina source compound, for example an alumina tri-hydrate $AH_3$ source compound.

In order to remain advantageous from an economic standpoint, it is necessary for the composition of step a) to comprise a maximum of 95% by mass of lime and alumina relative to the total mass of dry matter of the composition, that is to say, the compounds of this composition need not all be pure. This mass concentration level is measured on the basis of the dry matter, that is to say, in the absence of free water (for example, after drying for 24 hours at 110° C.).

The method makes it possible to use natural raw materials containing impurities, while also limiting the negative effects of these impurities on the performance of the hydraulic binder (unlike the conventionally used methods).

Using pure products would be less interesting economically and ecologically (given that they are themselves derived from energy-intensive industrial methods).

It is advantageous for the composition provided in step a) to contain at least 23% of alumina $Al_2O_3$ because this makes it possible to limit the amount of residual lime that is not combined at the conclusion of step c).

Preferably, the composition provided in step a) contains at least 25% of alumina. In a preferred manner, the composition provided in step a) contains at least 27% of alumina; alternatively, the composition provided in step a) contains at least 30% of alumina.

Preferably, the composition provided in step a) contains at least 25% of alumina tri-hydrate $AH_3$. In a preferred manner, the composition provided in step a) contains at least 27% of alumina tri-hydrate $AH_3$; alternatively, the composition provided in step a) contains at least 30% of alumina tri-hydrate $AH_3$.

According to one advantageous characteristic feature of the invention, the molar ratio of lime to alumina tri-hydrate "$C/AH_3$" of the composition of step a) is between 0.5 and 3. Alternatively, the molar ratio of lime to alumina "C/A" of the composition of step a) is between 0.5 and 3. The selection of a $C/AH_3$ ratio value of between 0.5 and 3 ensures the formation in step b), of the hydrated phase $C_3AH_6$ that comprises one molecule of alumina for six molecules of water and three molecules of lime. This hydrated phase $C_3AH_6$, when it is dehydrated in step c), provides calcium aluminates having an overall chemistry characterised by a C/A molar ratio of 3, and mineralogically several species may coexist, for example primarily calcium aluminate $C_{12}A_7$ and lime (either hydrated or non-hydrated).

Preferably, the composition provided in step a) contains less than 20% of silica $SiO_2$. For example, the composition provided in step a) contains less than 15% of silica $SiO_2$. Alternatively, the composition provided in step a) contains less than 10% of silica $SiO_2$. For example, the composition provided in step a) contains less than 8% of silica $SiO_2$. Alternatively, the composition provided in step a) contains less than 6% of silica $SiO_2$. A higher level of silica content tends to favour the appearance of alumina-free phases, such as C2S and C3S, phases which are found for example in Portland cement. These phases are less reactive than the alumina containing phases such as the calcium aluminate compounds.

Advantageously also, the composition of step a) is in this instance formed by the admixture of at least two compounds selected from the following list: iron rich bauxite, iron poor bauxite, quicklime or hydrated lime, calcium sulfate, calcium carbonate, hydrated aluminosilicates such as kaolin, synthetic alumina tri-hydrate $AH_3$, chlorinated salts or residues such as sodium chloride NaCl or sea water, or even nitrated salts or residues such as calcium nitrate $CaNO_3$ or pig manure slurry. The majority of these compounds exist in their natural state, which is advantageous from an economic standpoint.

Preferably, by way of alumina tri-hydrate source, use is made of a bauxite comprising mainly alumina tri-hydrate. This is advantageous because the natural reserves of this bauxite are abundant.

Preferably, by way of lime source compound, use is made of hydrated lime or quicklime. For example, hydrated lime is used as the lime source. Use of hydrated lime is easier to handle under conditions that are safe.

Advantageously, the composition of step a) comprises at least 5% of compounds selected from the following list: alumina mono-hydrate AH such as boehmite, iron oxides, silica $SiO_2$, calcite $CaCO_3$, titanium oxide $TiO_2$, salts (either hydrated or non-hydrated) that combine, as anion: sulfates, silicates, carbonates, nitrates, phosphates; and as cation: calcium, magnesium, iron, in particular hydrated or non-hydrated calcium salts such as calcium sulfates and calcium carbonate; hydrated or non-hydrated aluminum salts such as aluminum silicates and in particular kaolin; aluminum sulfates; chlorine salts or chlorinated residues; magnesium salts, or indeed even sodium salts such as sodium chloride available in particular in sea water.

For example, the composition of step a) comprises at least 5% of chlorides. For example, the composition of step a) comprises at least 5% of silicates, for example at least 5% of aluminum silicate, for example at least 5% of kaolin. For example, the composition of step a) comprises at least 5% of calcium sulfates and/or aluminum sulfates.

The at least 5% of precipitated compounds make it possible to provide functional characteristic features to the hydraulic binder that is finally obtained. By way of non-limiting examples, chlorides, which form Friedel's salts with calcium aluminates, make it possible to reduce the penetration of the salts within the medium. Whereas silicates, with calcium aluminates, promote the formation of strattlingite, which is not subjected to conversion. And sulfates promote the formation of ettringite or monosulfoaluminate, with good mechanical performance and/or performance related to shrinkage compensation, rapid drying, etc.

The composition of step a) may be in the form of a dry, free or compacted powder, or indeed it may even be in the form of a composition in an aqueous medium such as an aqueous suspension.

The particle size distribution of the compounds constituting the composition of step a) influences the speed of step b) of hydration. In fact, in step b), the combination, by means of dissolution and then precipitation in the form of hydrates, of the compounds of the composition of step a), is facilitated and accelerated through an increase in the reactive surface of these compounds.

Thus, advantageously, the entire set of particles of the composition of step a) all have a particle size distribution defined by a reference diameter d80 that is less than or equal to 100 micrometres.

The particle size distribution defined by this reference diameter d80 that is less than or equal to 100 micrometres ensures that the reaction speed in step b) is acceptable, under the operating conditions of pressure and temperature selected.

The reference diameter d80 of any set of particles is a quantity that is representative of the statistical distribution of the sizes of these particles, in other words of the particle size of this set of particles.

The reference diameter d80 is a reference diameter defined as the diameter (threshold) below which would be found 80% of the particles used, by volume relative to the total volume of the entire set of the said particles.

In other words, for a set of particles having a given reference diameter d80, 80% by volume of these particles would have a diameter that is less than this given reference diameter d80, and 20% by volume of these particles would have a diameter that is greater than this given reference diameter d80.

The term "diameter" in this instance is understood to refer to the largest dimension of the particle, whatever be its shape.

The reference diameter d80 for a set of particles is obtained from a particle size curve representing the statistical distribution of the size of each of the particles in this set.

In practice, the reference diameter d80 of a set of particles may be determined by various techniques, such as the sedimentation method (detection by X-ray absorptiometry) or the laser diffraction method (ISO 13320 standard). In the context of the present invention, the particle size is measured according to the standard ISO 13320 by means of the laser diffraction method, for example, with a laser diffraction type particle size analyser—Mastersizer 2000 or 3000 marketed by the company Malvern, under a pressure of 3 bars.

In order to achieve this reference diameter d80, the compounds of the composition provided in step a) can be ground. In particular, it is possible to consider grinding the compounds separately and then mixing them together to form the composition, or co-grinding the compounds, that is to say grinding them all together, to directly form the composition.

This preliminary grinding or co-grinding may be carried out in a wet or dry medium. It is in particular possible to use for this purpose a rotary tumbler jar ball mill with grinding balls, in which the mass of water introduced is such that it prevents clumping of the dry materials to be ground. This mass of water may for example be greater than or equal to the mass of dry matter introduced into the jar.

The preliminary grinding of the compounds of the composition of step a), in aqueous media, is generally accompanied by heating, whether natural or imposed, of the grinder used, such that the hydration reaction can commence upon the grinding occurring. Thus, it is possible to implement steps a) and b) of the method in a partially simultaneous manner. This results in savings in time and/or energy as compared to a method in which steps a) and b) are implemented in an entirely sequential manner. When steps a) and b) are carried out in a partially simultaneous manner, the water necessary for the hydration reaction is brought into contact with the composition of step a) upon the grinding occurring. In this case, the water used for grinding is to be introduced in an excess quantity as compared to the composition to be ground, such that, upon being ground, the medium within which the composition is placed is saturated with moisture.

Step b)

The moisture-saturated medium in which the composition is placed in step b) is formed by excess liquid water. In particular, the composition is placed in a quantity of water that is at least equal to the quantity of water necessary for the total hydration of the compounds in step a). The water may be supplied by the quantity of water necessary for the handling and manipulation of the products, for example during the wet phase grinding or for the conveying of the products from step b) to step c).

For example, in the case of wet phase grinding, the quantity of water required in order to obtain a paste which is sufficiently fluid to be handled and manipulated in an industrial method (in order to prevent clumping, etc) is largely sufficient to also enable the hydration of the raw materials over the course of step b). The person skilled in the art will know how to determine the required quantity of water, by checking to ascertain that the water is not a factor that limits the hydration process, for example by using a mineralogical measurement on the resulting products obtained from step b).

To do this, the composition of step a) is placed with excess liquid water in a container, for example made of plastic material or metal, in which it is heated. The composition is dispersed in liquid water, for example by means of a paddle agitator when the composition is dry before being brought into contact with water, or by means of the rotary tumbler jar when the composition is wet following wet grinding of the initial compounds in wet medium.

When the hydration temperature is selected to be higher than 100° C., the composition of step a) mixed with liquid water is placed in an autoclave or any other industrial installation that provides the means to satisfy the requisite conditions of temperature and pressure.

By way of a variant, it may be envisaged for the composition to be placed in a wet atmosphere, at the saturated vapour pressure of water. This atmosphere is then considered to be a moisture-saturated environment.

In both the cases, the moisture-saturated environment/medium includes excess water. In fact, the water should not be a factor that limits the hydration reaction. In addition, the presence of water after the hydration reaction of step b) facilitates the handling and manipulation of the hydrated phases obtained.

In step b), the ions that are able to be obtained by placing the composition of step a) in the moisture-saturated medium are in particular as follows: calcium ions $Ca^{2+}$, anions of aluminum hydroxide in basic medium $Al(OH)^{4-}$, sulfate ions $SO_4^{2-}$, anions of silicate in basic medium $SiO(OH)^{3-}$, carbonate ions $CO_3^2$, chloride ions $Cl^-$, and nitrate ions $NO_3^{2-}$.

The hydrated phases that are able to be obtained are thus then as follows: $CAH_{10}$, $C_2AH_8$, $C_3AH_6$, $C_4AH_{9-13}$, $C_2ASH_8$, $C_3A(CaSO_4)H_{19}$, $C_3A(CaSO_4)_3H_{32}$, $C_3A(CaCO_3)H_{19}$, $C_3A(CaNO_3)H_{19}$, $C_3A(CaCl_2)H_{19}$, in which $CaSO_4$, $CaCO_3$, $CaNO_3$, and $CaCl_2$), respectively represent calcium sulfate, calcium carbonate (or calcite), calcium nitrate, and calcium chloride.

Advantageously, the composition is placed in this moisture-saturated medium for a period of between 15 minutes and 48 hours. This time period is relatively short which is an advantage both in respect of the speed of production and in terms of energy saving.

As has been explained above, the increase in the reactive surface of the compounds of the composition provided in step a), makes it possible to facilitate and/or accelerate the hydration reaction of step b).

In addition to the increase in the reactive surface of the initial compounds, the hydration reaction of step b) can also be facilitated by an increase in the reaction temperature, or indeed even in the pressure.

This is why the hydration temperature in this instance is selected to be in the range extending between 40° C. and 150° C.

From a practical standpoint, any means that serves to raise the temperature may be used in order to achieve the desired hydration temperature in step b). For example, conventional heating means may be used (tunnel furnace, electrical resistances, etc.).

A temperature lower than 100° C., that is to say, in this instance comprised between 40° C. and 100° C., is particularly advantageous because it makes it possible to carry out step b) at atmospheric pressure, which is easy and advantageous from an economic and safety standpoint in an industrial installation.

A hydration reaction under hydrothermal conditions provides the ability to further accelerate the said hydration reaction. The term "hydrothermal conditions" is understood to refer to a temperature that is above the boiling temperature and a pressure that is sufficient to ensure a moisture-saturated environment/medium (that is for example, greater than 100° C., under a pressure of 1 atm). For a given temperature, the pressure must be higher than the saturated vapour pressure. For a selected temperature, the person skilled in the art could use for example the Duperray formula (valid between 90° C. and 140° C.), $P=(T/100)^4$, with P the pressure in Atmospheres, and T the temperature in ° C.

The duration of step b) is selected as a function of the hydration temperature. More specifically, the higher the hydration temperature, the shorter the duration of step b) will be. Thus, for example, in the case of hydrated lime and bauxite trihydrate ground to a d80 of 80 μm, the rate of progress of the hydration reaction is close to 90% after 8 minutes at a hydration temperature of 150° C., with this rate of progress being reached after 25 minutes at 100° C., after 90 minutes at 85° C., and after 20 hours at 40° C.

In a preferential manner, a hydration temperature comprised between 80° C. and 90° C., for example 85° C., will be selected. A duration of hydration comprised between 15 minutes and 48 hours will be selected. For example, the duration of hydration is between 18 hours and 30 hours, for example between 20 hours and 28 hours. For example, the duration of hydration is between 22 hours and 26 hours. For example, the duration of hydration is 24 hours.

The hydrated phases resulting from the hydration reaction of step b) are in the form of precipitates. They are either in the form of dry solid, that is to say without free water, or in suspension. When they are in suspension, they should be separated from the free water surrounding them because the subsequent evaporation of this free water, during the step c) of firing, represents an additional energy cost. This separation can be done by various means, in particular filtration, pressing, or even evaporation.

The eventual drying of the recovered precipitates may be envisaged, without however being necessary. This drying may be carried out between 80° C. and 260° C. approximately, under a dry atmosphere, for example by placing the precipitates in the furnace at 85° C., for a period of 24 hours. More generally, the drying is simultaneous with the implementation of the step c) of firing.

Step c)

In step c), the precipitated hydrated phases are subjected to a firing treatment.

At the conclusion of step c), the material obtained has a reactive capacity with water, which makes it a hydraulic binder.

The firing temperature selected for the implementation of step c) depends, on the one hand, on the hydrated phases formed in step b), and, on the other hand, on the calcium aluminates that are sought to be obtained at the conclusion of step c).

For example, at atmospheric pressure, the $CAH_{10}$ precipitate dehydrates at 200° C., while the $C_3AH_6$ precipitate dehydrates at 400° C. The dehydration temperatures of the usual hydrated phases are referenced in the FactSage or Gibbs Energy Minimisation (GEM) thermodynamic data tables.

In practice, the $C_3AH_6$ phase, which is the most stable hydrated calcium aluminate phase obtained in step b), is completely dehydrated at 400° C. It may however be beneficial to use a firing temperature that is higher than 400° C. to control the relative proportions of the other dehydrated phases and the overall reactivity of the hydraulic binder finally obtained.

Both the mineralogy and the crystallinity of the calcium aluminates that are liable to be obtained at the conclusion of step c) depend on the duration and the temperature of firing selected. Likewise, the proportions of these different calcium aluminates in the final hydraulic binder depend on the duration and on the firing temperature—also referred to as dehydration temperature—selected. For example, for an undoped calcium aluminate, the following phenomena will generally occur. For a firing temperature comprised between approximately 400° C. and approximately 500° C., the $C_3AH_6$ decomposes into $C_{12}A_7$ and hydrated lime $Ca(OH)_2$. For a firing temperature comprised between approximately 500° C. and approximately 600° C., the hydrated lime dehydrates, and the calcium aluminate therefore comprises a crystalline phase of $C_{12}A_7$ and dehydrated lime CaO. For a firing temperature comprised between approximately 600° C. and approximately 800° C.: if carbonates are present, they are decarbonated. For a firing temperature comprised between approximately 800° C. and approximately 900° C.: it results in the recrystallisation of the species, mainly $C_{12}A_7$ and lime CaO. From 900° C. onwards, it results in the recombination of the calcium aluminate and lime phases, evolving towards the chemical equilibrium of the initial composition. From 950° C. onwards: it results in the recombination of iron and silica with the phases of calcium aluminates, the amount of recombinant iron and silica increasing with the temperature.

In particular, from a crystallographic standpoint, after the step c) of dehydration, the substances obtained constitute a more or less amorphous mixture. The degree of crystallinity, the relative proportion of the crystalline phases, and the residual crystallised water depend on the duration and on the temperature of the step c) of dehydration.

In particular, a higher firing temperature has the effect of reducing the amorphous part and of developing the crystallised phases. The quantity of residual crystallised water decreases as the dehydration temperature increases. Other phenomena such as recrystallisation or recombination may also occur as the temperature increases, but these phenomena do not necessarily appear in sequential order. These phenomena of dehydration, recrystallisation or recombination each have their own kinetics, which also depend on the species considered. At a given temperature used in the step c) of firing, all of the reactions that might possibly occur at this temperature or else at a lower temperature could indeed take place, and thus increasing the duration of step c) allows for the reactions to approach the state of equilibrium.

Thus it is possible, with a well-selected firing temperature and time period, to orient the final mineralogical composition. If the temperature is high enough, increasing the duration of the step c) of firing has the effect of consequently reducing the amorphous part, developing the crystallised phases, and decreasing the quantity of crystallised residual water.

The calcium aluminates that are able to be obtained in crystalline form are as follows: $C_3A$ ($3CaO \cdot Al_2O_3$), $C_{12}A_7$ ($12CaO \cdot 7Al_2O_3$), CA ($CaO \cdot Al_2O_3$), $CA_2$ ($CaO \cdot 2Al_2O_3$) or $CA_6$ ($CaO \cdot 6Al_2O_3$) for the phases containing only lime and alumina, as well as $C_4A_3\$$ ($4CaO \cdot 3Al_2O_3 \cdot SO_3$) or $C_2AS$ ($2CaO \cdot Al_2O_3 \cdot SiO_2$) for the phases containing sulfur oxides or silica oxides. The hydraulic reactivity of these calcium aluminates, that is to say their capacity and speed of reaction with water, is variable. In general, the hydraulic reactivity of the "pure" calcium aluminate phases decreases when the C/A ratio, that is to say the molar (or mass) ratio between lime and alumina, decreases.

For example, in the case where the precipitate formed in step b) is $C_3AH_6$ the choice of a firing temperature of 400° C. in step c) leads to obtaining of the crystallised phase $C_{12}A_7$ and hydrated lime in the amorphous or poorly crystallised state, as well as any excess products which had not reacted in step b), namely Portlandite CH in the event of excess lime, and alumina monohydrate AH in the event of excess alumina. The relative proportions of the crystallised and amorphous phases obtained depend on the overall chemistry of the starting substances, in particular on the C/A ratio of the composition of step a).

Treatment at higher temperatures induces a reduction in the amorphous part, an increase in the already crystallised phases, as well as the appearance of new crystallised phases not observed at 400° C., such as the crystallised phases CA, $CA_2$, $C_4A_3\$$, $C_2AS$.

The duration and temperature of the firing in step c) are therefore to be defined according to the application and the reactivity targeted for the hydraulic binder produced.

In this instance, the firing temperature is selected within a range extending between 200° C. and 1300° C.

In particular, the firing temperature is preferably comprised between 400° C. and 1200° C., more preferably between 900° C. and 1000° C., indeed even more preferably between 930° C. and 970° C.

This firing temperature is significantly lower than the usual temperatures used in known calcium aluminate manufacturing methods, in particular those used in known sintering or fusion methods.

When step c) is carried out at a pressure that is below atmospheric pressure, the firing temperature can possibly be lowered, for example for a firing temperature that is lower than 600° C., without changing the properties of the final hydraulic binder obtained.

From a practical standpoint, any means that serves to raise the temperature may be used in order to achieve the desired firing temperature in step c). For example, conventional heating means or microwave heating may be used. In particular, the firing can be carried out in an electric furnace, with a temperature ramp rate of 300° C. per hour, until it reaches the desired firing temperature, this firing temperature then being maintained for the duration of a desired firing time. The cooling is subsequently controlled by means of ventilation of the furnace with a ramp rate of −300° C. per hour, until reaching a temperature close to 110° C. that allows for the handling and manipulation of the final product.

Advantageously, in step c), the firing time duration, that is to say the time period during which the hydrated phases are placed at the firing temperature, is comprised between 15 minutes and 240 minutes. This duration, being less than or equal to 4 hours is very reasonable and makes it possible to limit the energy consumption. Preferably, the firing time duration is equal to 3 hours or less.

According to one particularly advantageous characteristic feature of the method according to the invention, when using raw materials that contain secondary phases comprising iron and/or silica, it is possible to control the formation of certain crystalline phases, in particular Gehlenite $C_2AS$ and the ferrites $C_2F$ and/or $C_4AF$. This is advantageous because the presence of the ferrites $C_2F$ and/or $C_4AF$, and/or Gehlenite $C_2AS$ in the final hydraulic binder is not always desirable, depending on the application for which this hydraulic binder is intended. Indeed, the ferrites $C_2F$, $C_4AF$, and the Gehlenite $C_2AS$ result in a hydraulic binder that has a slower reactivity because their hydraulic potential is lower than that of pure calcium aluminates (CA or $C_{12}A_7$ phases), but they may also exhibit remarkable long-term mechanical strength behaviours—especially $C_4AF$. Thus, limiting the formation of the phases comprising ferrite and Gehlenite makes it possible to obtain, at the conclusion of step c), a hydraulic binder with rapid reactivity, that is to say a hydraulic binder exhibiting rapid setting and/or rapid increase in its initial resistance; whereas promoting the development thereof however, results in a hydraulic binder that will provide a cement which while less reactive, nevertheless exhibits good long term mechanical strength behaviours.

In practice, even when natural compounds containing elements such as iron or oxides thereof (for example certain bauxites), or containing silica, are used as compounds in the composition provided in step a), the operating conditions for step b) of the method according to the invention are such that they do not lead to the obtaining of new hydrated phases of calcium aluminates containing iron or silica. In fact, when they are present in step a), the iron, oxides thereof, or the silica, remain in free and non-recombinant form at the conclusion of step b). It is thus possible, depending on the firing temperature selected in step c), to include or not include, iron, oxides thereof, or silica, in the final dehydrated phases. More precisely, by being placed in step c), at a firing temperature that is lower than 900° C., none of the crystalline phases $C_2F$ and/or $C_4AF$, and/or $C_2AS$ is formed. On the other hand, all the residual lime present in the system following step b) remains in the form of hydrated lime or quicklime CaO, the latter exhibiting a high hygroscopy and excessively high reactivity, which are detrimental to the applications envisaged.

On the contrary, on being placed in step c) at a firing temperature comprised between 930° C. and 970° C., for example close to 950° C., for about 3 hours, the lime is found to be entirely combined in phases of calcium aluminates, and the iron and/or oxides thereof, just begin to react with the phases present in order to combine with the crystalline phases of calcium aluminate and form the crystallised phases of $C_2F$ and/or $C_4AF$.

Around a temperature of 1000° C., the ferrites seem to be formed in the form of $C_2F$ and/or $C_4AF$, while the silica is just beginning to combine with phases of calcium aluminates into $C_2AS$; however these phases are less reactive than the calcium aluminates.

It is thus advantageous to maintain a firing temperature that is lower than 1000° C., in order to limit the costly alumina mobilisation by iron and/or silica. For example, the firing temperature will be comprised between 200° C. and 750° C.; alternatively, between 200° C. and 700° C.

It is also advantageous for the composition of step a) to comprise a maximum of 0.4% by weight of fluorinated compounds selected from a $CaF_2$ source and/or cryolite $Na_3AlF_6$, relative to the weight of the dry composition of step a); alternatively the composition of step a) comprises a maximum of 0.3% by weight, for example a maximum of 0.2% by weight of fluorinated compounds selected from a $CaF_2$ source and/or cryolite $Na_3AlF_6$, relative to the weight of the dry composition of step a); for example, the composition of step a) does not comprise fluorinated compounds selected from a $CaF_2$ source and/or cryolite $Na_3AlF_6$.

Similarly, it is advantageous for the method according to the invention to not include the addition of fluorinated compounds selected from a $CaF_2$ source and/or cryolite $Na_3AlF_6$.

In fact, the use of these compounds in a calcium aluminate manufacturing method involves the formation of a gas, HF, which is corrosive, dangerous for operators and toxic to the environment. These compounds are more expensive and not compatible with an economical method.

The method according to the invention always results in the obtaining of a calcium aluminate compound that is very friable or brittle. When necessary, the calcium aluminate compound can easily be reduced to a powder, for example by means of a mortar and pestle, or by means of 5 to 10 minutes of processing in a grinder such as a rotary tumbler jar.

It is therefore not necessary to use high-energy mills, such as ball mills. Where such grinders are nevertheless used, they would be used for a very short period of time.

The method according to the invention also always results in the obtaining of a calcium aluminate compound with a high specific surface area (according to the Brunauer-Emmett-Teller or BET method). Thus, the calcium aluminate compound obtained by the method according to the invention has for example a specific surface area greater than 7 $m^2/g$; or even more than 20 $m^2/g$. For example, the calcium aluminate compound obtained by the method according to the invention has a specific surface area greater than 40 $m^2/g$.

Advantageously, the calcium aluminate compound obtained can be used as a hydraulic binder.

More precisely, the calcium aluminate compound obtained can be used either alone or combined with calcium sulfate and possibly with portland cement so as to form a hydraulic binder.

The hydraulic binder thus formed may for example be used in the following applications:
 in building chemistry, for the production of mortars such as repair mortars, tiling adhesives and grouts or joints, smoothing or finishing screeds and coatings, or even decorative plasters or coatings;
 as a binder for refractory concrete;
 as a binder for civil engineering concrete;
 as a binder for any prefabrication type method;
 as binders for cementing of boreholes;
 as a binder for dry or wet sprayed concrete (shotcrete).

The calcium aluminate compound obtained may also be used in the following applications:
 as a metallurgical flux;
 as a mineral filler;
 as a catalyst or catalyst support;
 as a pigment;
 as an abrasive.

The following examples illustrate the present invention, however without any limitation thereof intended.

Examples

A/ Preparation of Hydraulic Binders According to the Invention

A1. Raw Materials

The raw materials listed in the Tables 1-1 and 1-2 below are used to manufacture, according to the method of the invention, the calcium aluminate compounds LH1 to LH11.

TABLE 1-1

| | Chemical Makeup | | | | | | | |
|---|---|---|---|---|---|---|---|---|
| | $Al_2O_3$ | CaO | $SiO_2$ | $Fe_2O_3$ | $SO_3$ | Impurities | LOI | TOTAL Chemical makeup |
| Bauxite A Wépa | 61 | 0 | 0.7 | 3.5 | 0 | 3.9 | 31 | 100 |
| Bauxite B (Boké batch A) | 53.1 | 0 | 8.9 | 11.25 | 0 | 3.15 | 24 | 100 |
| Bauxite C (Boké batch B) | 52.3 | 0 | 2.2 | 19.5 | 0 | 3.7 | 22 | 100 |
| Lime Ca(OH)$_2$ | 0.4 | 77 | 0.8 | 0.4 | 0 | 1.3 | 20 | 100 |
| AH3 (Gibbsite Altéo SH500) | 65 | 0 | 0 | 0 | 0 | 0.6 | 34 | 100 |
| Plaster (CaSO$_4$•0.5H$_2$O) | | | | | | | | |
| Gypsum (CaSO$_4$•2H$_2$O) | 0.3 | 31 | 1.9 | 0.3 | 45 | 1.6 | 20 | 100 |

TABLE 1-2

| | Mineralogy | | | |
|---|---|---|---|---|
| | CH | AH$_3$ | CaSO4•xH$_2$O | Impurities |
| Bauxite A Wépa | | 87.2 | | 8.1 |
| Bauxite B (Boké batch A) | | 61.9 | | 23.9 |
| Bauxite C (Boké batch B) | | 71.4 | | 28.6 |
| Lime Ca(OH)$_2$ | 98.2 | | | 1.8 |
| AH3 (Gibbsite Altéo SH500) | | 99.7 | | 0.3 |
| Plaster (CaSO$_4$•0.5H$_2$O) | | | 96.1 | 3.9 |
| Gypsum (CaSO$_4$•2H$_2$O) | | | 95.9 | 4.1 |

The loss on ignition LOI here mainly represents the moisture content of the raw materials, measured by the relative weight loss after drying at 110° C. for a period of 24 hours.

In particular, three bauxites rich in alumina tri-hydrate AH$_3$ are evaluated, presenting various levels of impurity (mainly represented by iron oxides and silica): bauxite A (Australian) is poor in iron oxide and silica, while bauxite B or bauxite C (Guyannaise, referred to as Boke) are richer in iron oxides. The gypsum plaster is a calcium sulfate hemi-hydrate, the gypsum is a calcium sulfate di-hydrate, bearing in mind that everything will be found in di-hydrate form during step b).

The calcium aluminate compounds LH2 to LH7 obtained according to the method of the invention are themselves used as hydraulic binders in order to form the pure pastes denoted P1 to P10, and P*, and the mortars M1, M11, M12, M13 and M14, as well as the comparative mortars MC1 and MC2. Among the raw materials used for forming the said mortars, the following are included: anhydrite FF®, which is an anhydrous calcium sulfate marketed by the company Francis Flower, ordinary portland cement, abbreviated as "OPC" which is the portland cement marketed by the company Milke (reference OPC 52.5R), sand NE14 (AF-NOR standard silica sand), citric and tartaric acids, sodium carbonate Na$_2$CO$_3$.

A2. Calcium Aluminate Compound Obtained According to the Method of the Invention Table 2 below groups together the various initial compositions as well as the operating conditions of the method of the invention effectively implemented in order to obtain the calcium aluminate compounds LH1 to LH 11. In this table 2, in step a), the mass percentages are given by mass either relative to the total mass of the wet composition, or relative to the total mass of dry matter of the composition.

TABLE 2

| | Step a) Dry Composition | | | | | | | Wet Composition | |
|---|---|---|---|---|---|---|---|---|---|
| | | | | | | | | AH$_3$ + CH | |
| | Bauxite B (mass %) | Bauxite C (mass %) | Lime CH (mass %) | Plaster (mass %) | C/A Molar Ratio | Gypsum | AH$_3$ | AH$_3$ + CH (mass %) calculated | Al$_2$O$_3$ + CaO calculated |
| LH1 | — | 56 | 44 | — | 2.3 | — | — | 83.2 | 47.4 | 33.5 |
| LH2 | — | 75 | 25 | — | 1 | — | — | 78.1 | 44.5 | 30.5 |
| LH3 | — | 68 | 32 | — | 1.4 | — | — | 80 | 45.6 | 31.7 |
| LH4 | — | 62 | 38 | — | 1.8 | — | — | 81.6 | 46.5 | 32.6 |
| LH5 | — | 75 | 25 | — | 1 | — | — | 78.1 | 44.5 | 30.5 |
| LH6 | — | — | 25.7 | — | 0.98 | 20 | 54.3 | 80 | n.d. | n.d. |
| LH7 | — | — | 25.7 | — | 0.98 | 20 | 54.3 | 80 | n.d. | n.d. |
| LH8 | 57.3 | — | 38.6 | 4.1 | 2.3 | — | — | 73.4 | n.d. | n.d. |
| LH9 | 63 | — | 33.2 | 3.8 | 1.8 | — | — | 71.6 | n.d. | n.d. |
| LH10 | 56.7 | — | 43.3 | — | 2.6 | — | — | 77.6 | n.d. | n.d. |
| LH11 | 62.2 | — | 37.8 | — | 2.0 | — | — | 75.6 | n.d. | n.d. |

TABLE 2-continued

| | Step b) Hydration | | | | | Step c) Firing | | | BET Surface Area |
|---|---|---|---|---|---|---|---|---|---|
| | Al₂O₃ + CaO calculated | Silica (mass %) | Temperature (° C.) | Duration (hours) | Diameter d80 (µm) | Temperature (° C.) | Duration (hours) | Diameter d80 (µm) | Final Cement (m2/g) |
| LH1 | 33.5 | 0.4 | 85 | 24 | 5.5 | 400 | 3 | 9.3 | 24 |
| LH2 | 30.5 | 0.5 | 85 | 24 | n.d. | 400 | 3 | 8.7 | 120 |
| LH3 | 31.7 | 0.5 | 85 | 24 | n.d. | 400 | 3 | 8.1 | 85 |
| LH4 | 32.6 | 0.4 | 85 | 24 | n.d. | 400 | 3 | 8 | 59 |
| LH5 | 30.5 | 0.5 | 85 | 24 | n.d. | 900 | 3 | 7.1 | 26 |
| LH6 | — | — | 80 | 24 | n.d. | 400 | 3 | 13.5 | 87.4 |
| LH7 | — | — | 80 | 24 | n.d. | 950 | 3 | 12.8 | 7.8 |
| LH8 | — | 3.14 | 100 | 24 | n.d. | 1200 | 4 | n.d. | n.d. |
| LH9 | — | 3.44 | 100 | 24 | n.d. | 1200 | 4 | n.d. | n.d. |
| LH10 | — | 3.1 | 100 | 24 | n.d. | 1200 | 4 | n.d. | n.d. |
| LH11 | — | 3.28 | 100 | 24 | n.d. | 1200 | 4 | n.d. | n.d. | n.d. not determined

A3. Analysis of the Calcium Aluminate Compounds Obtained

A3.1 Fineness

The fineness of the calcium aluminate compounds LH1 to LH11 is measured on an optical bench, by the laser diffraction method, according to standard ISO 13320, with a laser diffraction type particle size analyser—Mastersizer 2000, marketed by the company Malvern, optical model "Fraunhofer", under a pressure of 3 bar.

Table 3 below summarises the fineness of the calcium aluminate compounds LH2 to LH7 obtained according to the method of the invention, under the operating conditions presented in table 2. More precisely, this table 3 indicates the reference diameters d10, d50, d80 and d90 of the various different compounds obtained. These reference diameters define the particle size distribution of the entire set of particles constituting each compound obtained. In particular, the reference diameter d10 is a reference diameter defined as the diameter (threshold) below which would be found 10% of the particles used, by mass relative to the total mass of the entire set of the said particles. The reference diameter d50 is a reference diameter defined as the diameter below which would be found 50% of the particles used, by mass relative to the total mass of the entire set of the said particles. And, the reference diameter d90 is a reference diameter defined as the diameter below which would be found 90% of the particles used, by mass relative to the total mass of the entire set of the said particles.

The fineness is obtained after the grinding of the compounds obtained at the conclusion of step c), with a pestle and mortar for 5 minutes (LH3, LH4, LH5, LH6 and LH7), or for 10 minutes (LH2).

TABLE 3

| | Calcium Aluminate Compound | | | | | |
|---|---|---|---|---|---|---|
| | LH2 | LH3 | LH4 | LH5 | LH6 | LH7 |
| Diameter d10 (µm) | 1.23 | 1.48 | 1.84 | 0.54 | 1.98 | 1.2 |
| Diameter d50 (µm) | 5.01 | 4.83 | 4.49 | 3.67 | 7.93 | 6.19 |
| Diameter d80 (µm) | 8.72 | 8.11 | 8 | 7.13 | 13.49 | 12.79 |
| Diameter d90 (µm) | 11.08 | 10.24 | 10.63 | 9.36 | 16.99 | 17.16 |

The fineness of the calcium aluminate compounds LH2 to LH7 corresponds to that of a fine cement. By way of comparison, a conventional commercially available calcium aluminate, manufactured by the fusion method followed by grinding in a ball mill, for example of the type Ternal® RG-S or Ternal® EP marketed by the company Kerneos, has a diameter d80 of the order of 65 µm.

Thus, the products obtained according to the method of the invention, after light and rapid grinding, are as fine, indeed even finer, than the conventional hydraulic binders that are ground by conventional energy-intensive means such as ball or roller mills.

In addition, the compound LH2, which is ground for a period twice as long, is not particularly finer than the compounds LH3 to LH7. This indeed clearly shows that a light grinding is sufficient to obtain a fine cement by using the method according to the invention.

In addition, the products obtained by the method of the invention exhibit the particularity of having a specific surface area according to the BET method that is higher than the cements existing on the market, which is particularly advantageous.

A3.2 Chemical Composition

The chemical composition of the calcium aluminate compounds LH1 to LH11 can be analysed in an equivalent manner by various different methods from which a person skilled in the art would be able to choose easily, for example by means of X-ray diffraction, or even by a thermo-gravimetric analysis (TGA) method. In this instance, X-ray fluorescence analysis using glass beads is selected. The protocol is as follows: mixing 0.85 g of calcined material and 5.15 g of lithium tetraborate; preparing the bead using the PANalytical brand Perl'x3 system (fusion profile: 50 s at 900° C., then 230 s at 1050° C., then 230 s at 1100° C. and casting); analysing the bead using the BRUKER brand S4 Pioneer XRF spectrometer apparatus, via the Perle program.

Table 4 below summarises the mineralogical composition of the calcium aluminate compounds LH1 to LH11 obtained.

TABLE 4

| | LH1 | LH2 | LH3 | LH4 | LH5 | LH6 | LH7 | LH8 | LH9 | LH10 | LH11 |
|---|---|---|---|---|---|---|---|---|---|---|---|
| Boehmite, AH (mass %) | 8.8 | 7.8 | 6.6 | 5.4 | | 2.3 | | | | | |
| Gibbsite, AH3 (mass %) | 0 | | | | | | | | | | |
| Goethite Fe3 + O(OH) (mass %) | 0 | | | | | | | | | | |
| Hematite, Fe2O3 (mass %) | 14.5 | 11.3 | 10.7 | 9.1 | 10.9 | | | | | | |
| Rutile, TiO2 (mass %) | 0 | 0 | 0 | 0 | 0.1 | | | | | | |
| Anatase, TiO2 (mass %) | 1.4 | 1 | 0.8 | 0.7 | | | | | | | |
| Quartz, SiO2 (mass %) | 1.8 | 0.9 | 1.1 | 0.7 | 0.7 | | | | | | |
| Portlandite, CH (mass %) | | | | | | 2.1 | | | | | |
| Calcite, CaCO3 (mass %) | 7 | 2.4 | 2.1 | 1.7 | | 3.8 | | | | | |
| C12A7 (mass %) | | 14.2 | 17.4 | 18.7 | 11.1 | | 13.3 | (72) | (68) | (115) | (87) |
| C12A7 poorly crystallised (mass %) | 63 | 61.4 | 60 | 62.1 | 30.4 | | | | | | |
| Amorphous chemistry C$A | | | | | | 91.1 | | | | | |
| Portlandite, CH (mass %) | 3.5 | 0.5 | 0.9 | 1.4 | | | | | | | |
| CA | | | | | 32.7 | | 46.7 | (38) | (54) | (24) | (11) |
| C3A | | | | | 2.3 | | 0 | | | | |
| C2F | | | | | 5.7 | | tr | (8) | (5) | (5) | |
| C2AS | | | | | | | tr | tr | Tr | Tr | |
| CA2 | | | | | | | 5.1 | | | | |
| C4A3$ | | | | | | | 22.2 | (12) | (50) | — | — |
| Corundum Al2O3 | | | | | 4.8 | | | | | | |
| Free lime CaO | | 0.3 | 0.2 | 0.2 | 1.2 | | 0.7 | 3.5 | 1.4 | 6 | 4.8 |
| Anhydrite CaSO4 | | | | | | | 12 | 22 | 15 | | |
| TOTAL | 100 | 99.8 | 99.8 | 100 | 99.9 | 99.3 | 100 | | | | | tr: traces
(x): relative intensity of the X diffraction peaks; mass % not calculated Thus, as shown in Table 4, the calcium aluminate compounds LH1 to LH11 obtained all comprise at least one calcium aluminate.

Depending on the degree of firing, it is possible to obtain: binders very rich in $C_{12}A_7$, akin to Ternal® EP distributed by the company Kerneos; or binders very rich in CA phase, akin to Ternal® RG; or a new binder having a calcium sulfoaluminate phase $C_4A_3\$$, of which the hydraulic potential is recognised.

B/ Properties of the Mortar Formed from the Hydraulic Binders Obtained According to the Method of the Invention B1. Composition of the Mortars The calcium aluminate compounds LH1 to LH11 are used, in combination with calcium sulfate and/or Portland cement, as a hydraulic binder in order to form the pastes numbered P1 to P10, as well, when sand is added to the binding phase, to form the mortars numbered M1, M11, M12, M13 and M14, as well as the comparative mortars MC1 and MC2 using commercially available calcium aluminates. P* is an assay with 100% LH6, that is to say without the addition of Portland cement or calcium sulfate.

The compositions are provided in Tables 5 and 6 below. In Table 5, the compositions are provided by mass of each compound relative to the total mass of paste, while in Table 6, they are provided by mass of each compound relative to the total mass of mortar (% by mass).

The mortar MC1 is a comparative mortar made in order to compare the properties of the mortar M1 to that of a mortar obtained from an existing aluminous cement, the cement Ternal EP® (TEP*) marketed by the company Kerneos. This cement, obtained according to the fusion method from natural raw materials (bauxite monohydrate and limestone) contains mainly lime and alumina according to a C/A molar ratio of 1.77, approximately 8% of iron oxide, and presents as the main mineralogical phase $C_{12}A_7$. It is used as a binding phase in combination with calcium sulfate, for the production of mortars.

The mortar MC2 is obtained with the commercially available product Ciment Fondu® (Cr), the production of which is similar to that of Ternal EP, it only has a C/A molar ratio of around 1.73 and an iron oxide content level of around 15%, and has as main mineralogical phase CA.

In practice, the formulations P1 to P10, P*, M1, M11, M12, M13, M14, MC1, MC2 are weighed and then homogenised for 15 minutes in a mixer of such type as a "Turbulat".

The admixed powders are then introduced into the bowl of a mortar mixer of such type as a "Rayneri" mixer, and after dry mixing, for 30 seconds at 60 revolutions per minute (rpm), a quantity of water, referred to as mixing water, is added all at once, then the mixing continues for 30 seconds at 60 rpm, and then for another 30 seconds at 120 rpm.

TABLE 5

|  |  | P1 | P2 | P3 | P4 | P5 | P6 | P7 | P8 | P9 | P10 | P* |
|---|---|---|---|---|---|---|---|---|---|---|---|---|
| Powder | Calcium Aluminate Compound (mass %) | LH1 8.8 | LH1 11.7 | LH1 13.2 | LH1 14.6 | LH2 12.0 | LH3 12.0 | LH4 12.0 | LH5 12.0 | LH6 12.0 | LH7 12.0 | LH6 100 |
|  | Anhydrite FF ® (mass %) | 20.5 | 17.6 | 16.1 | 14.6 | 18.0 | 18.0 | 18.0 | 18.0 | 18.0 | 18.0 | — |
|  | OPC Cement (mass %) | 69.7 | 69.7 | 69.7 | 69.7 | 70.0 | 70.0 | 70.0 | 70.0 | 70.0 | 70.0 | — |
|  | Sand NE14 (mass %) | — | — | — | — | — | — | — | — | — | — | — |
|  | Tartaric Acid (mass %) | — | — | — | — | — | — | — | — | 0.16 | 0.0 | — |
|  | $Na_2CO_3$ (mass %) | 0.90 | 0.90 | 0.90 | 0.90 | 0.91 | 0.91 | 0.91 | 0.91 | 0.91 | 0.91 | — |
|  | Citric Acid (mass %) | 0.16 | 0.16 | 0.16 | 0.16 | 0.16 | 0.16 | 0.16 | 0.16 | 0.0 | 0.16 | — |
| Water (mass % over binder) |  | 45.5 | 45.5 | 45.5 | 45.5 | 46 | 46 | 46 | 46 | 46 | 46 | 46 |

TABLE 6

|  |  | M1 | MC1 | M11 | M12 | M13 | M14 | MC2 |
|---|---|---|---|---|---|---|---|---|
| Dry Mortar Composition | Calcium Aluminate Compound (mass %) | LH1 11.9 | TEP* 11.9 | LH8 35.7 | LH9 35.7 | LH10 35.7 | LH11 35.7 | CF* 35.7 |
|  | Anhydrite FF ® (mass %) | 17.9 | 17.9 |  |  |  |  |  |
|  | OPC Cement (mass %) |  |  |  |  |  |  |  |
|  | Sand NE14 (mass %) | 69.5 | 69.5 | 64.3 | 64.3 | 64.3 | 64.3 | 64.3 |
|  | Tartaric Acid (mass %) | 0.18 | 0.38 |  |  |  |  |  |
|  | Na2CO3 (mass %) | 0.57 | 0.28 |  |  |  |  |  |
|  | Citric Acid (mass %) |  |  |  |  |  |  |  |
| Water (mass % over binder) |  | 49 | 49 | 40 | 40 | 40 | 40 | 40 |

The calcium aluminate compounds LH8 to LH11, respectively, are used alone as hydraulic binders in order to form the mortars M11 to M14, according to the AFNOR standard.

More precisely, according to this AFNOR standard, 1350 g of sand and 750 g of hydraulic binder are first mixed, then water is added, with a mixing water/hydraulic binder ratio equal to 0.4.

The mortar MC2 is a comparative mortar formed according to this AFNOR standard, from Ciment Fondu® (CF) marketed by the company Kerneos. The Ciment Fondu® is obtained according to a conventional high-temperature fusion method, from bauxite rich in alumina mono-hydrate and limestone.

B2. Open Time for Mortars

The open time for some of the mortars thus obtained is given in table 7. The open time corresponds to the time during which the mortar has a viscosity that is suitable for the handling and manipulation, and positioning thereof. In other words, the open time corresponds to the time that elapses between the time instant when the water is added to the hydraulic binder, and the time instant when the setting of the binder begins, which is identified by an increase in temperature of the water-hydraulic binder admixture.

TABLE 7

|  | Mortars | | | | | | |
|---|---|---|---|---|---|---|---|
|  | M1 | MC1 | M11 | M12 | M13 | M14 | MC2 |
| Open Time | 42 minutes | 38 minutes | 3 h 30 | 6 h 50 | 1 h 50 | 3 h 30 | 2 h 10 |

Table 7 shows that the open times for the mortars M1, and M11 to M14 respectively, obtained from hydraulic binders produced according to the method of the invention are equivalent to the open times for the comparative mortars MC1, MC2 respectively.

The assay P* results in a flash setting, that is to say that the setting is brought about promptly upon being mixed with water, with an open time value of zero. This is indicative of a significant hydraulic potential.

B3. Manufacture of Mortar Prisms

The mortars M1, M11 to M14, and MC1, and the pastes P1 to P10 are placed in a metal mould in which they are left for the duration of time taken to set. The dimensions of the mould are as follows: 20×20×160 mm³, so as to produce a mortar prism having the same dimensions as those of the mould. The mould is kept at 20° C., at a relative humidity of 80%, for a period of 1 hr, 2 hr, 4 hr, 5 hr, 6 hr, or even 24 hr, before the hardened material is removed from the mould and tested. The relative humidity, also referred to as moisture content level, is defined as the ratio of the partial pressure of water vapour contained in the air to the saturated vapour pressure (or vapour pressure) at the same temperature. In other words, the relative humidity indicates the ratio between the water vapour content of the air in which the mould is kept and the maximum capacity of this air to contain water under predetermined temperature conditions.

B4. Determination of Mechanical Strengths of Cement Prisms

The mechanical strengths including flexural strength and compressive strength are tested on prismatic test specimens of hardened material obtained at various time intervals, 1 hour, 5 hours or even 24 hours after bringing about contact of the powder (binder+additives+possibly sand) with the water.

The mechanical strengths are evaluated according to the French cement testing standard NF EN 196-1, by using a press known as the Presse 3R. More precisely, the flexural strength (FS) is first evaluated, and thereafter the compressive strength (CS) is evaluated using the resulting two half-test specimens derived from the bending test. The force applied to the test specimen until failure (rupture) occurs makes it possible for the rupture stress to be calculated (in MegaPascal, denoted as MPa), both in respect of flexural and compressive strength, according to the standard NF EN 196-1.

The Tables 8 to 10 below summarise the different mechanical strength values obtained for the mortar prisms, at 20° C., after 2 hr, 6 hr, or 24 hr, of setting (mortars M1 or MC1); after 1 hr, 5 hr, or 24 hr, of setting (paste P1 to P10); or after 4 hr, 6 hr, and 24 hr, setting (mortars M11 to M14 and MC2).

TABLE 8

|  |  | Mortars | |
|---|---|---|---|
|  |  | M1 | MC1 |
| Flexural Strength (MPa) | 2 h | 1.8 | 0 |
|  | 6 h | 2.6 | 1.06 |
|  | 24 h | 3.4 | 3.1 |
| Compressive Strength (MPa) | 2 h | 9.6 | 0.9 |
|  | 6 h | 18.6 | 2.5 |
|  | 24 h | 24.5 | 19.2 |

The mechanical strength values for the mortar M1 obtained from the hydraulic binder that comprises the calcium aluminate compound LH2 produced according to the method of the invention are indeed far higher than those obtained for the mortar MC1 produced from the commercially available hydraulic binder Ternal EP® obtained according to a conventional method.

TABLE 9

|  | P1 | P2 | P3 | P4 | P7 | P8 | P9 | P10 |
|---|---|---|---|---|---|---|---|---|
| FS - 1 h (MPa) | 0.9 | 1.6 | 1.7 | 2.1 | — | — | — | — |
| FS - 5 h (MPa) | 1 | 1.7 | 2.5 | P2 | — | — | — | — |
| FS - 24 h (MPa) | 3.4 | 4.3 | 5 | 5.5 | — | — | — | — |
| CS - 1 h (MPa) | 1.9 | 3.5 | 3.3 | 4.3 | 2 | 3 | 3.1 | 2.1 |
| CS - 5 h (MPa) | 2.3 | 4.3 | 4.6 | 5.7 | 2.5 | 4 | 3.2 | 10.4 |
| CS - 24 h (MPa) | 11.3 | 20.2 | 17.9 | 26.4 | 18 | 20 | 25.8 | 24.8 |

This assessment of mechanical strength proves that the calcium aluminate compounds produced according to the method of the invention can be used as hydraulic binders in numerous applications where binders that are based on calcium aluminates are already used.

With non-optimised formulations of so-called ettringite-based binders, very interesting results are already obtained in terms of short-term mechanical strengths, attesting to their potential for use in all applications where conventional calcium aluminates are currently used as ettringite-based binders.

TABLE 10

|  |  | Mortars | | | | |
|---|---|---|---|---|---|---|
|  |  | M11 | M12 | M13 | M14 | MC2 |
| Flexural Strength (MPa) | 4 h | 3 | — | 7.6 | 6.9 | 3.5 |
|  | 6 h | 5.6 | — | 9.8 | 8.4 | 6 |
|  | 24 h | 11.8 | 8.9 | 12.2 | 10.7 | 7.9 |
| Compressive Strength (MPa) | 4 h | 8 | — | 67 | 54.6 | 21.5 |
|  | 6 h | 37.6 | — | 80.3 | 72.5 | 48 |
|  | 24 h | 96.8 | 70.7 | 91.2 | 88.2 | 61.5 |

The results in Table 10 above show that the mortars M11 to M14 obtained from the hydraulic binders LH8 to LH11 produced according to the method of the invention have mechanical strengths in terms of flexural and compressive strengths of the same order of magnitude as those of the comparative mortar MC2 obtained from the Ciment Fondu®. The hydraulic binders LH8 to LH11 produced according to the method of the invention can therefore be used in applications similar to those in which Ciment Fondu® is used, bearing in mind that in this instance use is made of pure calcium aluminate cement (CAC) binder (no calcium sulfate or OPC added).

The invention claimed is:

1. A hydraulic binder manufacturing method for manufacturing a hydraulic binder comprising a calcium aluminate, the method including the following steps:
    a) providing a composition comprising a lime source compound and an alumina source compound, the said composition comprising a maximum of 95% lime and alumina, and a minimum of 23% alumina, by mass relative to the total mass of dry matter of the composition;
    b) placing the composition provided in step a) in a moisture-saturated environment (medium), at a hydration temperature comprised between 40° C. and 150° C., so as to precipitate the hydrated phases comprising at least one aluminium oxide combined with a calcium oxide and with water;
    c) subjecting the precipitates obtained in step b) to a firing temperature comprised between 200° C. and 1300° C., keeping them thereat for at least 15 minutes,
    wherein in step a), the composition is in the form of a set of particles whereof the particle size distribution is defined by a reference diameter d80 that is less than or equal to 100 micrometers.

2. The method according to claim 1, according to which in step a), the alumina source compound is an alumina tri-hydrate $AH_3$ source compound.

3. The method according to claim 2, according to which in step a), the composition has a molar ratio of lime C to alumina tri-hydrate $C/AH_3$ of between 0.5 and 3.

4. The method according to claim 1, according to which, in step a), the composition comprises at least 5% of compounds selected from the following list: alumina monohydrate AH, iron oxides, silica $SiO_2$, calcite $CaCO_3$, titanium oxide $TiO_2$; hydrated or non-hydrated salts that combine, as anion: sulfates, silicates, carbonates, nitrates, phosphates; and as cation: calcium, magnesium, iron; hydrated or non-hydrated aluminum salts; aluminum sulfates; chlorine salts or chlorinated residues; magnesium salts; and sodium salts.

5. The method according to claim 1, according to which, in step b), the composition is placed in excess liquid water or in an atmosphere at the saturated vapour pressure of water.

6. The method according to claim 1, according to which in step b), the composition is placed in the moisture-saturated environment (medium) for a period of between 15 minutes and 48 hours.

7. The method according to claim 1, according to which in step c), the precipitates are subjected to the firing temperature, being kept thereat for less than 240 minutes.

8. The method according to claim 1, according to which, in step c), the firing temperature is comprised between 400° C. and 1200° C.

9. The method according to claim 1, according to which, in step b), the hydration temperature is less than 100° C.

10. The method according to claim 1, according to which the composition of step a) is formed by the admixture of at least two compounds selected from the following list: iron rich bauxite, iron poor bauxite, quicklime or hydrated lime, calcium sulfate, calcium carbonate, hydrated aluminosilicates, synthetic alumina tri-hydrate $AH_3$, chlorinated salts or residues, and nitrated salts or residues.

11. A calcium aluminate compound obtained by the method according to claim 1.

12. A hydraulic binder comprising the calcium aluminate compound of claim 11.

13. A metallurgical flux comprising the calcium aluminate compound according to claim 11.

14. A mortar comprising a binder, the binder comprising the calcium aluminate compound of claim 11.

15. A concrete comprising a binder, the binder comprising the calcium aluminate compound of claim 11.

16. A reagent comprising the calcium aluminate compound of claim 11.

17. A mineral filler comprising the calcium aluminate compound of claim 11.

18. A catalyst comprising the calcium aluminate compound of claim 11.

19. A pigment comprising the calcium aluminate compound of claim 11.

* * * * *